(12) United States Patent
Lee et al.

(10) Patent No.: US 9,762,714 B2
(45) Date of Patent: Sep. 12, 2017

(54) MOBILE TERMINAL

(71) Applicant: LG ELECTRONICS INC., Seoul (KR)

(72) Inventors: Byunghwa Lee, Seoul (KR); Changjae Kim, Seoul (KR); Choonghwan Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/030,847

(22) PCT Filed: Jul. 10, 2014

(86) PCT No.: PCT/KR2014/006220
§ 371 (c)(1),
(2) Date: Apr. 20, 2016

(87) PCT Pub. No.: WO2015/064887
PCT Pub. Date: May 7, 2015

(65) Prior Publication Data
US 2016/0277555 A1    Sep. 22, 2016

(30) Foreign Application Priority Data
Oct. 30, 2013    (KR) .......................... 10-2013-0130303

(51) Int. Cl.
*H04M 1/00* (2006.01)
*H04M 1/23* (2006.01)
(Continued)

(52) U.S. Cl.
CPC ....... *H04M 1/236* (2013.01); *H04M 1/72563* (2013.01); *H04M 1/0262* (2013.01); *H04M 1/0264* (2013.01); *H04M 1/22* (2013.01)

(58) Field of Classification Search
CPC . H04M 1/236; H04M 1/0264; H04M 1/72563
(Continued)

(56) References Cited

U.S. PATENT DOCUMENTS

2014/0004907 A1* 1/2014 Kim ................... H04M 1/72519
455/566
2014/0347330 A1* 11/2014 Kim ...................... G06F 1/1637
345/184

(Continued)

FOREIGN PATENT DOCUMENTS

JP      H08-123760        5/1996
KR      1020090086842    8/2009
(Continued)

OTHER PUBLICATIONS

PCT International Application No. PCT/KR2014/006220, International Searching Report dated Oct. 17, 2014, 3 pages.

*Primary Examiner* — Lee Nguyen
(74) *Attorney, Agent, or Firm* — Lee, Hong, Degerman, Kang & Waimey

(57) ABSTRACT

A mobile terminal is disclosed. A mobile terminal according to the present invention includes: a terminal body composed of at least one case; a display provided to a front side of the terminal body; and a rear input module provided to a rear side of the terminal body and including at least one button to receive control commands from a user, wherein the rear input module is covered by the at least one case such that the at least one button is not exposed. Accordingly, the rear input module is not exposed to the outside.

22 Claims, 14 Drawing Sheets

(51) Int. Cl.
*H04M 1/725* (2006.01)
*H04B 1/38* (2015.01)
*H04M 1/02* (2006.01)
*H04M 1/22* (2006.01)

(58) Field of Classification Search
USPC .......................................... 455/566; 345/184
See application file for complete search history.

(56) References Cited

U.S. PATENT DOCUMENTS

2015/0334859 A1* 11/2015 Lee ...................... H05K 5/0247
    361/749
2016/0165027 A1* 6/2016 Hahn ...................... H04B 1/38
    455/566
2016/0173673 A1* 6/2016 Hyun .................... H04M 1/236
    455/566

FOREIGN PATENT DOCUMENTS

| KR | 1020100127929 | 12/2010 |
| KR | 1020130045111 | 5/2013 |
| KR | 1020130090965 | 8/2013 |

* cited by examiner

[Figure 2]
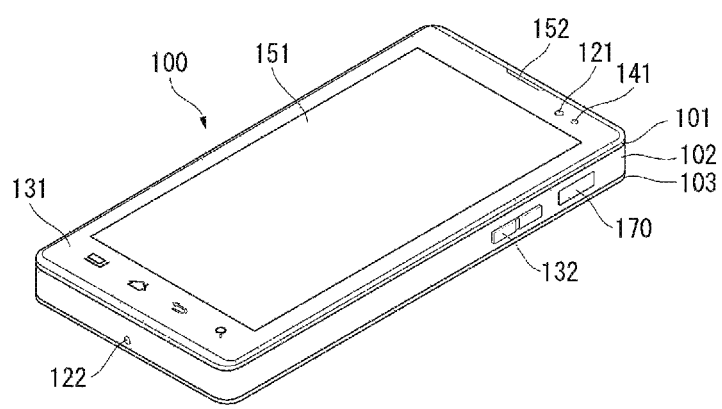

[Figure 3]
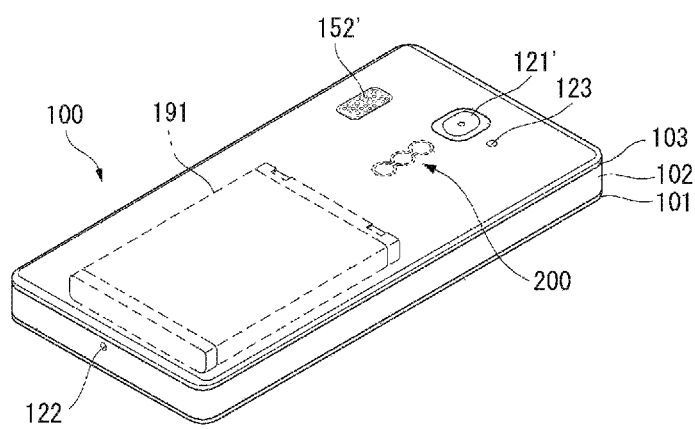

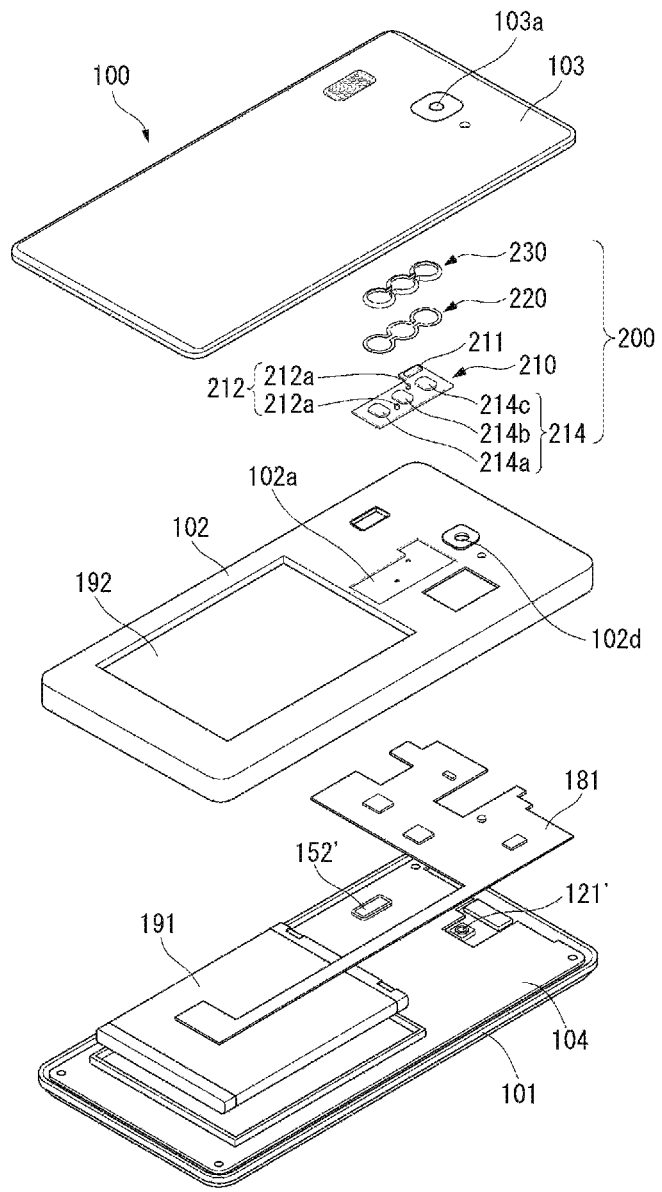
【Figure 4】

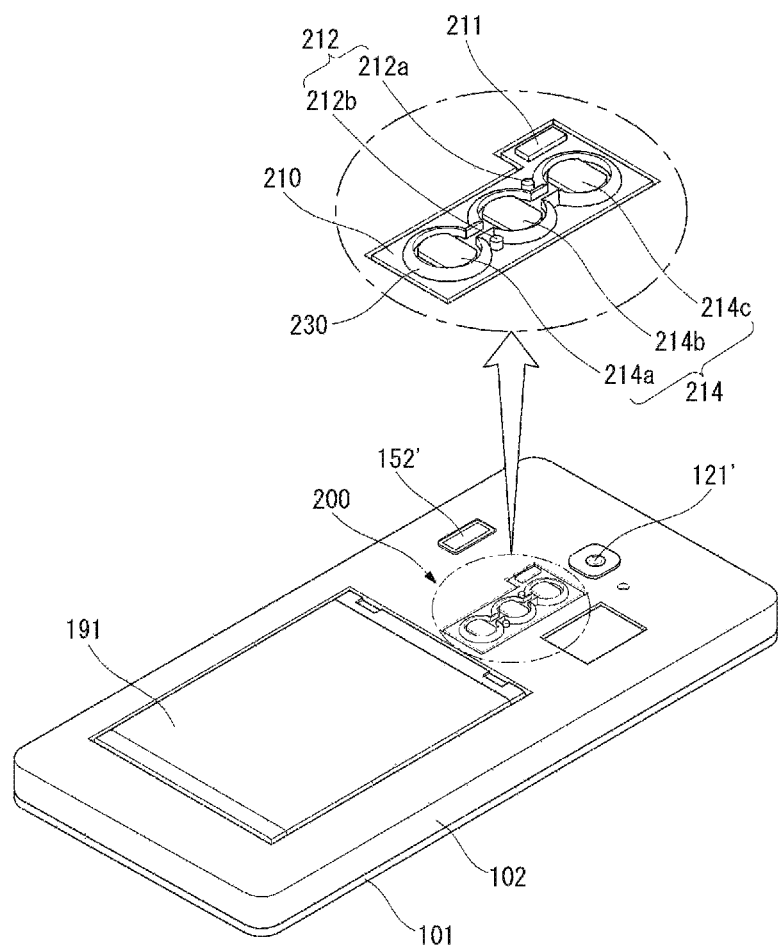
[Figure 5]

【Figure 6】
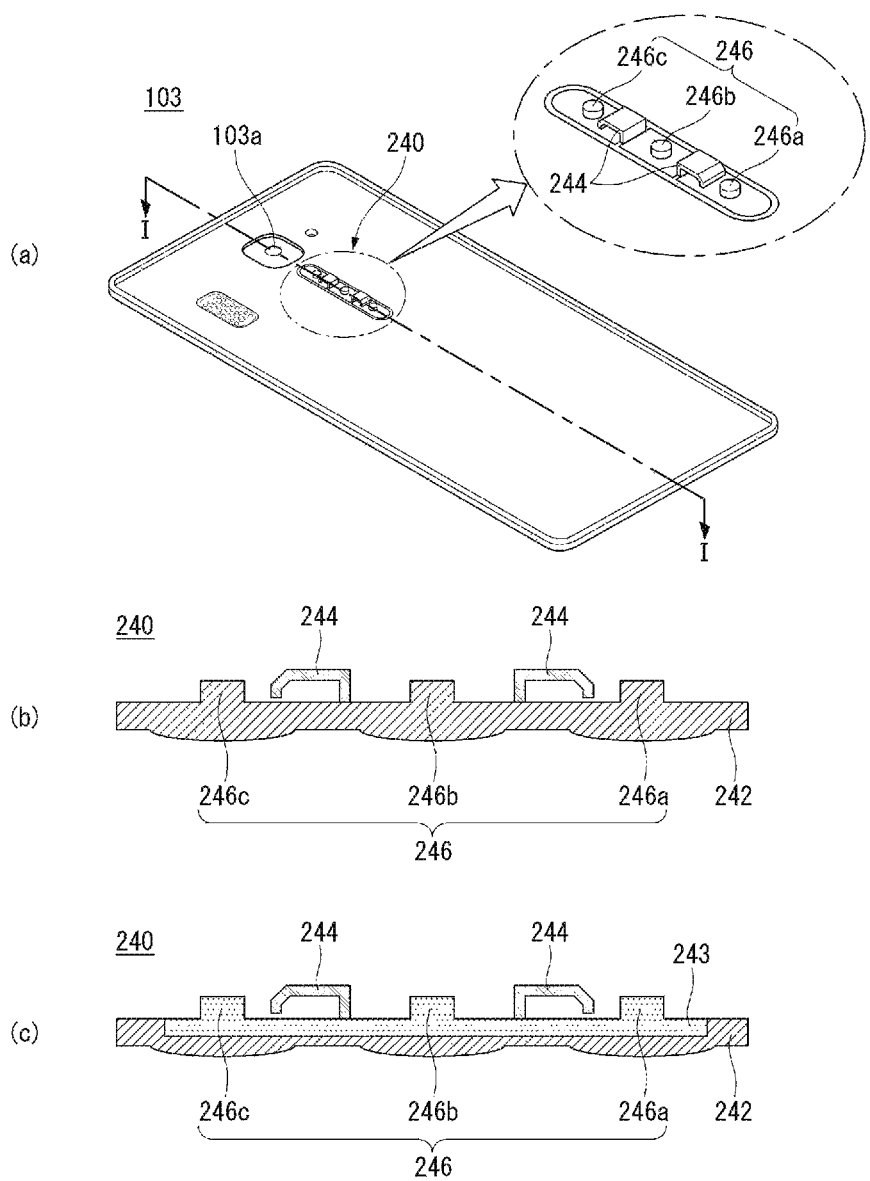

[Figure 7]
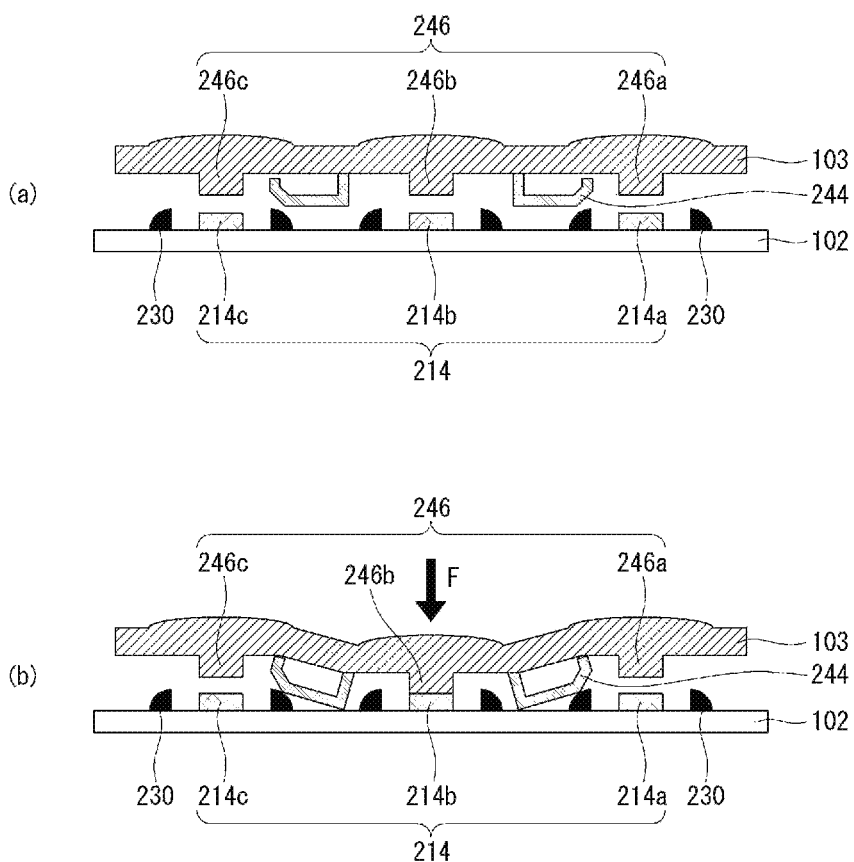

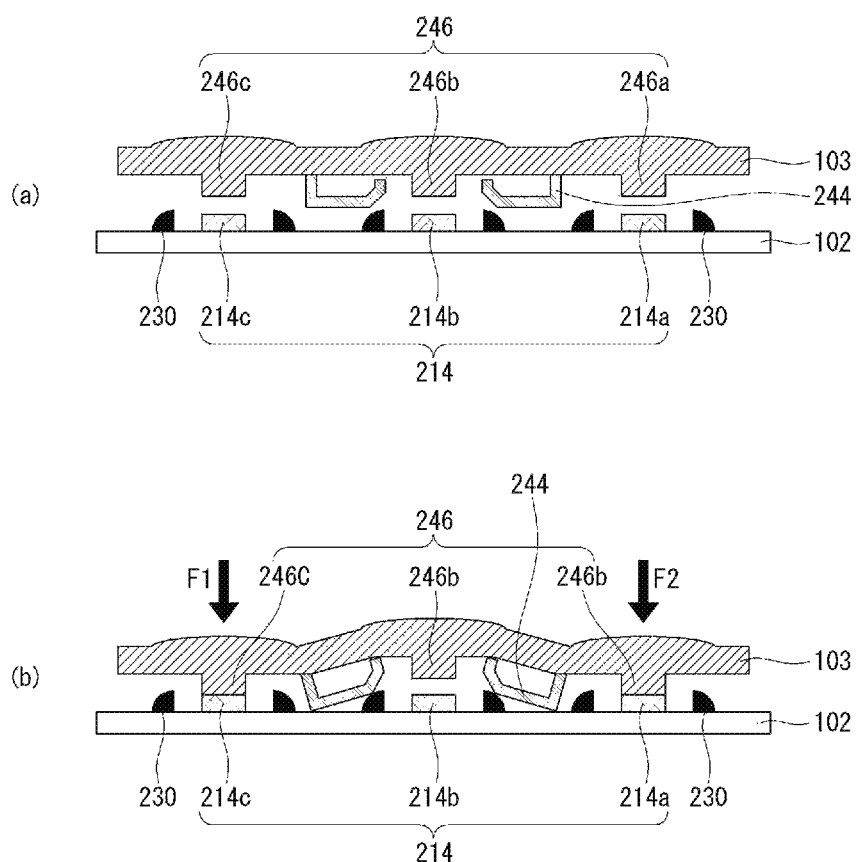
[Figure 8]

[Figure 9]
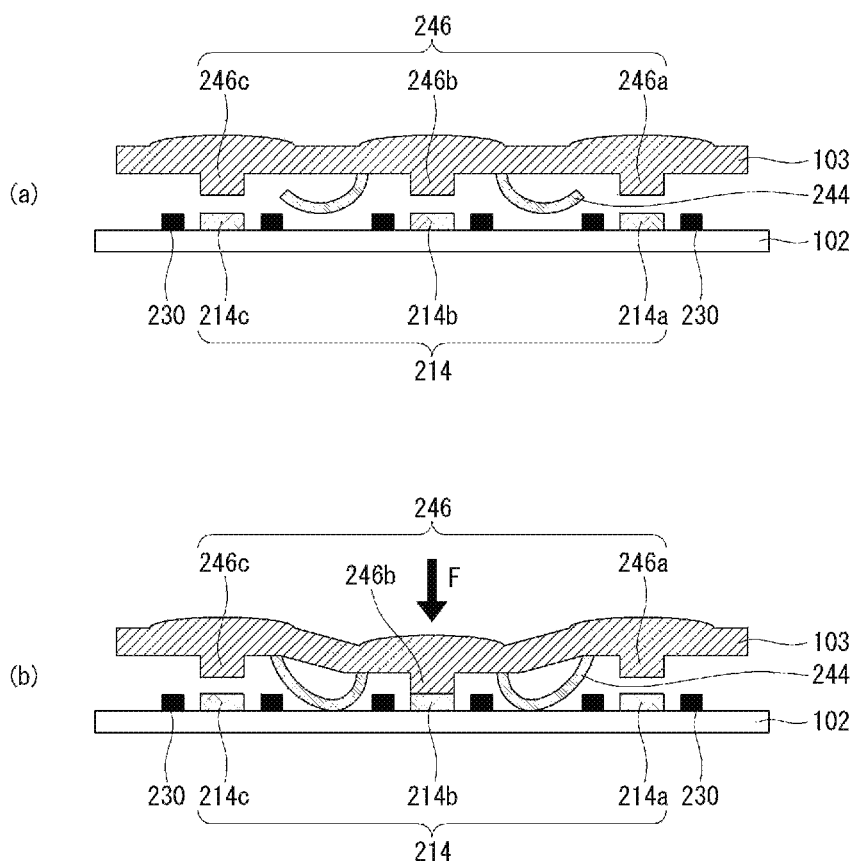

【Figure 10】
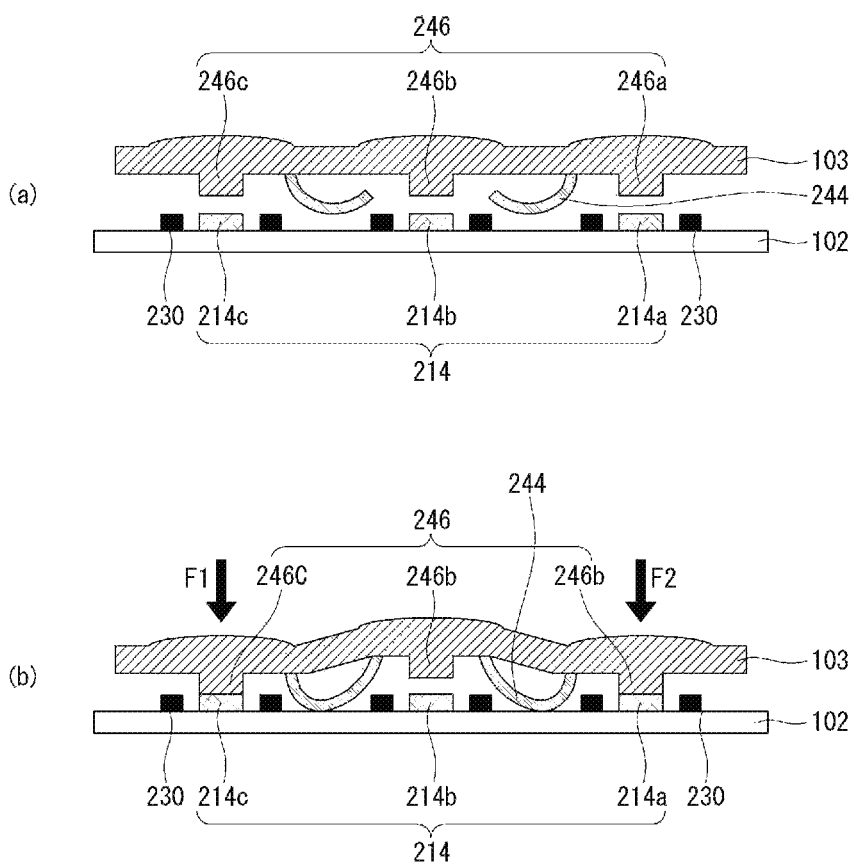

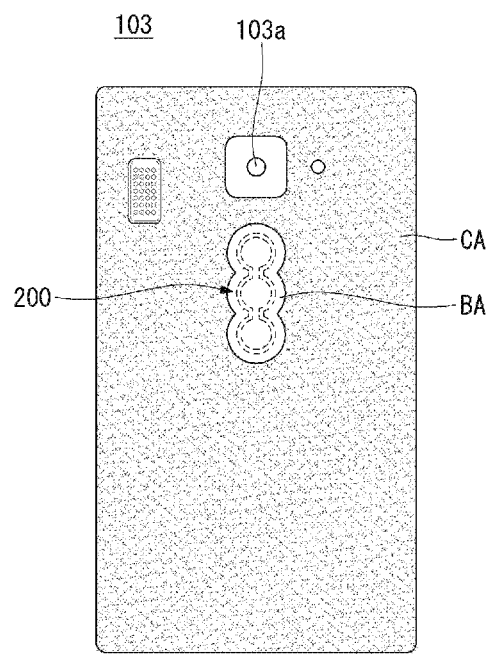
[Figure 11]

【Figure 12】
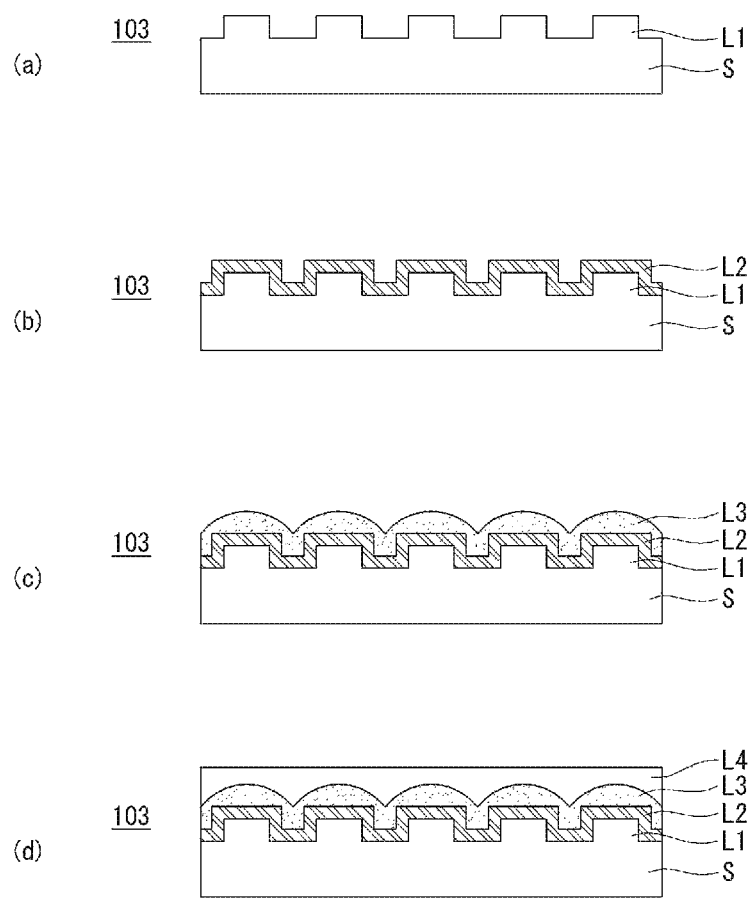

【Figure 13】
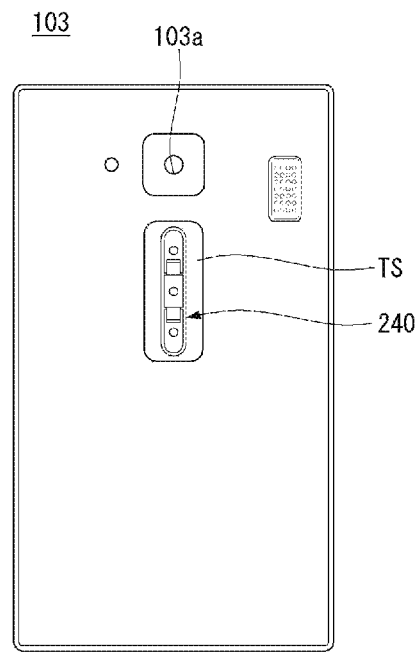

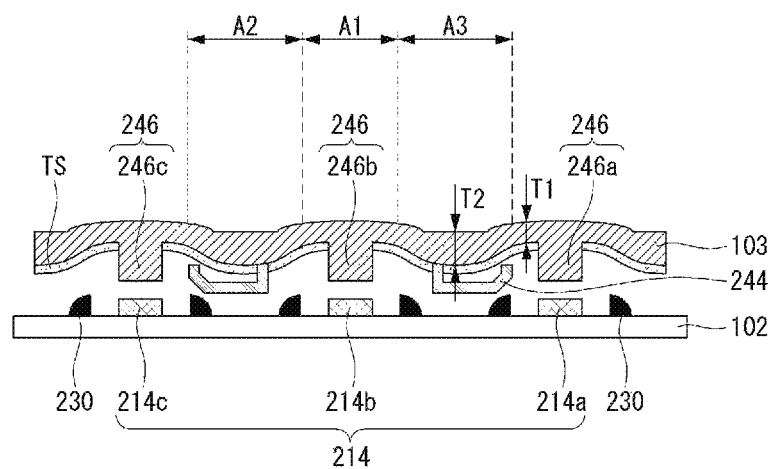
[Figure 14]

MOBILE TERMINAL

CROSS-REFERENCE TO RELATED APPLICATIONS

This application is the National Stage filing under 35 U.S.C. 371 of International Application No. PCT/KR2014/006220, filed on Jul. 10, 2014, which claims the benefit of Korean Application No. 10-2013-0130303, filed on Oct. 30, 2013, the contents of which are all hereby incorporated by reference herein in their entirety.

TECHNICAL FIELD

The embodiments of the present invention are directed to a mobile terminal and a method of controlling the mobile terminal, and more specifically to a mobile terminal and a method of controlling the mobile terminal, which can set a virtual area adjacent to a display area and control an item selected according to an attribute of the virtual area

BACKGROUND ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

DISCLOSURE

Technical Problem

The present invention relates to a mobile terminal including a rear input module that is not exposed.

Technical Solution

According to one aspect of the present invention, there is provided a mobile terminal, including: a terminal body composed of at least one case; a display provided to a front side of the terminal body; and a rear input module provided to a rear side of the terminal body and including at least one button to receive control commands from a user, wherein the rear input module is covered by the at least one case such that the at least one button is not exposed.

A camera module may be provided to the rear side of the terminal body and photograph objects behind the terminal body, wherein the at least one case has at least one through-hole for exposing at least part of the camera module.

The rear input module may include a module board having at least one dome switch provided thereon and a guide arranged around the circumference of the at least one dome switch.

The rear input module may further include a light-emitting unit configured to emit light according to a control signal of a controller, wherein the guide is a light diffusing member for transferring light emitted from the light-emitting unit along the guide.

The at least one case may have at least one fine through-hole through which light transferred along the guide is emitted to the outside through the at least one case, the at least one fine through-hole being formed at a position corresponding to the guide.

The rear input module may further include at least one guide protrusion contacting the outside of the guide so as to fix a coupling position of the guide.

The at least one case may have at least one contact protrusion and at least one elastic rib provided therein, the at least one contact protrusion being disposed at a position corresponding to the at least one dome switch, the at least one elastic rib protruding toward the rear input module around the at least one contact protrusion.

One end of the at least one elastic rib may come into contact with the inside of the at least one case so as to prevent the at least one case from being deformed by external force when the external force is applied to the at least one case.

The at least one elastic rib may be elastically deformed by contacting the guide when the external force is applied to the at least one case.

The at least one elastic rib may be elastically deformed by contacting another case when the external force is applied to the at least one case.

A pair of elastic ribs may be provided having a center contact protrusion, from among the at least one contact protrusion, disposed therebetween.

The at least one contact protrusion may come into contact with a dome switch corresponding to the at least one contact protrusion, from among the at least one dome switch, when the external force is applied to the at least one case.

At least one of the at least one elastic rib and the at least one contact protrusion may be insert-injection-molded into the at least one case.

The surface of the at least one case may include a coarse area sensed through concave-convex portions formed therein according to tactile sensation, wherein an area of the at least one case corresponding to the rear input module includes a smooth area through which concave-convex portions are not sensed.

At least one of the coarse area and the smooth area may be formed by laminating at least one layer on the surface of the at least one case.

The inside of the at least one case may include a thermally conductive sheet having a high thermal transfer coefficient, the thermally conductive sheet being attached to an area corresponding to the rear input module.

The thickness of at least part of the area of the at least one case, to which the thermally conductive sheet is attached, may differ from at least part of an area to which the thermally conductive sheet is not attached.

The at least part of the area to which the thermally conductive sheet is attached may be thinner than the at least part of the area to which the thermally conductive sheet is not attached.

The at least one case may be a battery case.

The rear input module may be arranged to overlap with the display in the thickness direction of the terminal body.

A plurality of dome switches may be provided, wherein the dome switches are vertically arranged in a line in the terminal body.

According to another aspect of the present invention, there is provided a mobile terminal, including: a first case configured to form a front side of the terminal to which a display is provided; a second case combined with the first case and including a rear input module having at least one button for receiving control commands from a user; and a third case combined with the second case and covering a rear side of the terminal including a battery accommodating part, wherein the third case covers the rear input module by being combined with the second case and is elastically deformed in the thickness direction of the terminal by external force applied by the user such that a control command is input through at least one button included in the covered rear input module.

Advantageous Effects

According to the mobile terminal according to the present invention, the rear-side input module is not exposed to the outside.

DESCRIPTION OF DRAWINGS

FIG. 2 is a front perspective view of the mobile terminal shown in FIG. 1.

FIG. 3 is a rear perspective view of the mobile terminal shown in FIG. 1.

FIG. 4 is an exploded perspective of the mobile terminal shown in FIG. 3.

FIG. 5 is a perspective view of the mobile terminal shown in FIG. 3 when a battery cover is separated from the mobile terminal.

FIG. 6 shows a rear view and cross-sectional views of the battery cover of the mobile terminal shown in FIG. 3.

FIG. 7 illustrates operation of a rear input module of the mobile terminal shown in FIG. 3.

FIGS. 8, 9 and 10 illustrate operations of the rear input module of the mobile terminal shown in FIG. 3 according to various embodiments.

FIGS. 11 and 12 illustrate a configuration of the battery cover of the mobile terminal shown in FIG. 3.

FIGS. 13 and 14 illustrate a configuration of the battery cover of the mobile terminal shown in FIG. 3 according to another embodiment.

MODE FOR INVENTION

Figure 1:
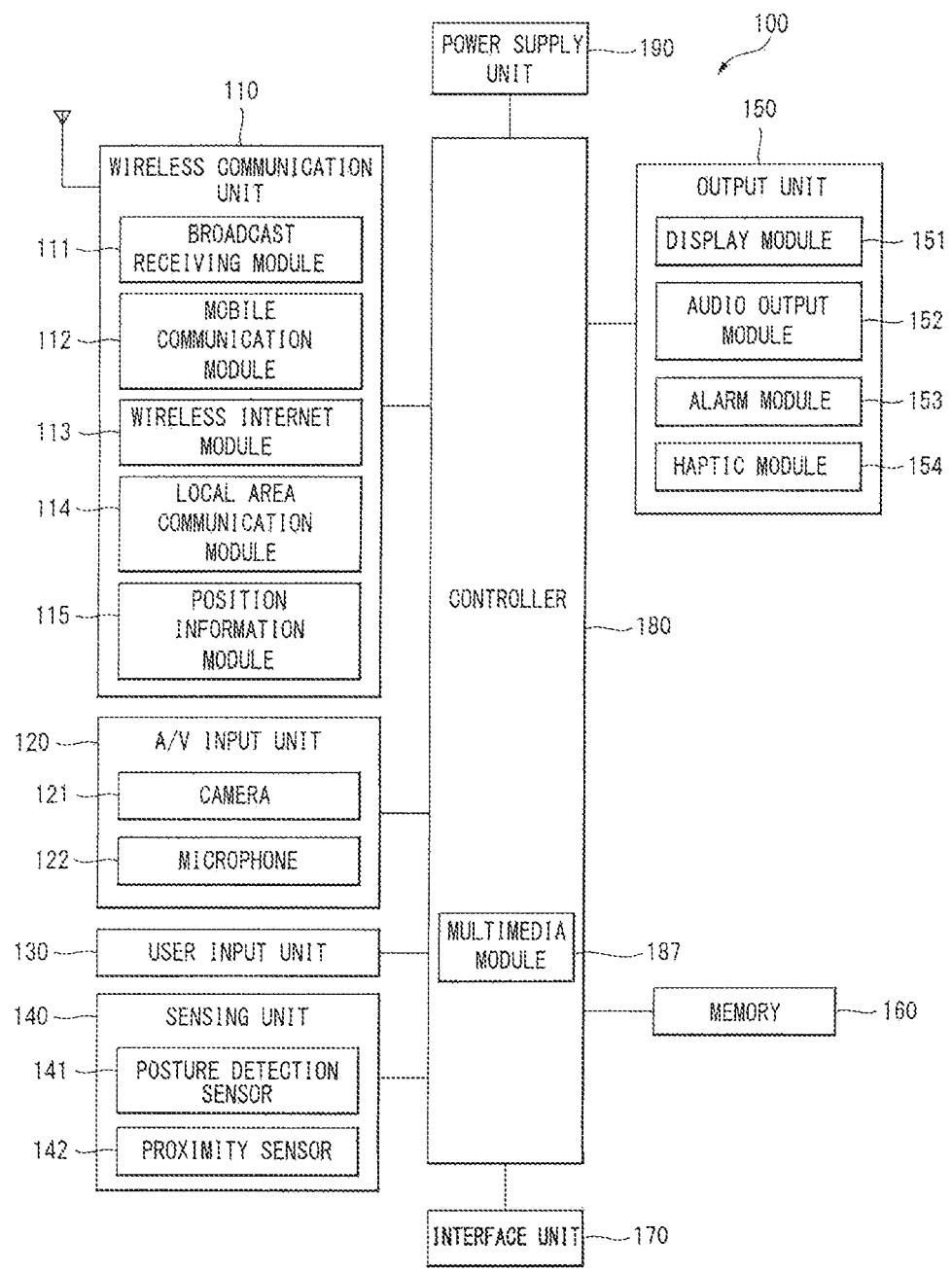
FIG. 1 is a block diagram of a mobile terminal according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (NV) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or ZigBee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera module 121 and a microphone 122. The camera module 121 may process image frames of still images or moving images obtained by an image sensor in a video telephony mode or a photographing mode. The processed image frames may be displayed on a display 151 which may be a touch screen.

The image frames processed by the camera module 121 may be stored in the memory 160 or may be transmitted to an external device through the radio communication unit 110. The mobile terminal 100 may also include at least two camera modules 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a posture detection sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 142 of the sensing unit 140 may be located in an internal region of the mobile terminal 100, surrounded by the touch screen, or near the touch screen. The proximity sensor 142 may sense an object approaching a predetermined sensing face or an object located near the proximity sensor using an electromagnetic force or infrared rays without having mechanical contact. The proximity sensor 142 may have a lifetime longer than a contact sensor and may thus have a wide application in the mobile terminal 100.

The proximity sensor 142 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 142.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 142 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may he connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 187 for playing multimedia. The multimedia module 187 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

FIG. 2 is a front perspective view of the mobile terminal shown in FIG. 1 and FIG. 3 is a rear perspective view of the mobile terminal shown in FIG. 1.

As shown in FIGS. 2 and 3, the mobile terminal 100 according to an embodiment of the present invention may include optimal input buttons through which user input is applied.

The illustrated mobile terminal 100 includes a bar-type terminal body. However, the present invention is not limited thereto and may be applied to terminals of various types including slide type, folder type, swing type and/or swivel type terminals having at least two bodies that are movably relative to each other.

The terminal body may include a case (a casing, a housing, a cover, etc.) that forms an exterior of the mobile terminal 100. For example, the case can be divided into a front case 101, a rear case 102 and a battery case 103. Various components may be arranged in the space formed between the front case 101 and the rear case 102. At least one frame (104 of FIG. 4) may be additionally provided between the front case 101 and the rear case 102.

The cases may be formed of plastics through injection molding or made of a metal material such as stainless steel (STS), titanium (Ti) or aluminum (Al).

The display 151, the audio output module 152, the posture detection sensor 141 and the camera module 121 may be arranged in the terminal body, more particularly, the front case 101. The microphone 122, a side input unit 132 and the interface 170 may be provided to the sides of the front case 101 and the rear case 102.

The display 151 may occupy most of the front face of the front case 101. That is, the display 151 is provided to the front side of the terminal body and outputs visual information. The audio output module 152, the posture detection sensor 141 and the camera module 121 may be arranged in a region in proximity to one of both ends of the display 151 and a front input unit 131 may be located in a region in proximity to another end of the display 151. The front input unit 131 is an example of the user input unit (130 of FIG. 1) and may include a plurality of manipulation units. The manipulation units may be commonly called a manipulation portion. The front input unit 131 may employ any tactile manner in which a user manipulates the front input unit 131 while feeling the same. In the present embodiment, the front input unit 131 is configured in the form of a touch key. However, the present invention is not limited thereto and a push key may be added to the front input unit 131.

The display 151 may form a touchscreen with a touch sensor. Here, the touchscreen can serve as the user input unit 130, and thus a configuration in which the mobile terminal 100 does not have the front input unit 131 can be implemented. In this case, the mobile terminal 100 may be configured such that input is applied to the terminal body only through the display 151 and a rear input module 200 which will be described later.

The side input unit 132, which is configured as another example of the user input unit 130, may receive commands such as adjustment of volume of sound output from the audio output module 152 and switching to a touch recognition mode of the display 151. The side input unit 132 may be removed according to design of the mobile terminal 100. That is, if user input is applied through the rear input module 200, the side input unit 132 can be omitted. When the side input unit 132 is omitted, the width of the bezel can be reduced. Accordingly, the display 151 can be configured to have a larger screen.

Referring to FIG. 3, a camera module 121' may be additionally provided to the rear side of the terminal body, that is, the rear case 102. The camera module 121' may have a photographing direction opposite the front camera module (121 of FIG. 2) and different resolution than the front camera 121. For example, it is desirable that the front camera module 121 be a low-resolution camera since the front camera 121 usually takes a picture of the face of the user and sends the picture to a counterpart during video telephony and the rear camera module 121' be a high-resolution camera since the rear camera 121' takes a picture of an object and does not immediately send the picture. The camera modules 121 and 121' may be installed in the terminal body such that the camera modules 121 and 121' are rotatable or can be popped up.

A flash 123 and a mirror (not shown) may be additionally arranged in proximity to the camera module 121'. The flash 123 illuminates an object when the camera module 121' photographs the object. The mirror may reflect the face of the user when the user wants to take a selfie using the camera module 121'.

An audio output module 152' may be additionally provided to the rear side of the terminal body. The rear audio output module 152' may implement a stereo function with the front audio output module (152 of FIG. 2) and may be used as a speakerphone mode during telephone conversation.

A battery 191 for supplying power to the mobile terminal 100 is fitted in the terminal body. The battery 191 is configured as an example of the power supply 190. The battery 191 may be built in the terminal body or detachably attached to the terminal body.

The rear input module 200 may be arranged on the rear side of the terminal body. The rear input module 200 is configured as an example of the user input unit (130 of FIG. 1). The rear input module 200 may be arranged in proximity to the camera module 121' exposed from the rear side of the terminal body.

The rear input module 200 may include at least one button through which the user inputs commands for controlling operations of the mobile terminal 100. Manipulation through the rear input module 200 may be set in various manners. For example, commands such as power on/off, start, end and scroll and a command such as adjustment of volume of sound output from the audio output modules 152 and 152' or switching to the touch recognition mode of the display 151 can be input through the rear input module 200.

The rear input module 200 may be implemented such that push input can be applied thereto. That is, the rear input module 200 may be a physical button operating according to push operation of the user.

The rear input module 200 may not be visible from the outside. For example, the rear input module 200 may be covered by the battery cover 103. In this case, the mobile terminal 100 can have a clean appearance.

A control command from the user can be input through the rear input module 200 even when the rear input module 200 is covered by the battery cover 103. The battery cover 103 may be elastically deformed to a certain degree in the thickness direction of the mobile terminal 100 when the user applies external force thereto. Buttons included in the rear input module 200 can be operated through the elastically deformed battery cover 103. The mobile terminal 100 according to an embodiment of the present invention can include the rear input module 200 that is not visually sensed due to the battery cover 103 but sensed through other means such as touch. In addition, the mobile terminal 100 according to an embodiment of the present invention can include the rear input module 200 that is covered by the battery cover 103 but can receive correct input from the user.

The position of the rear input module 200 can be sensed by touch through a user's finger. For example, the region of the battery cover 103, which corresponds to the rear input module 200, may be slightly protruded and/or recessed, compared to the other region of the battery cover 103 or may have roughness different from the other region such that the user can sense the rear input module 200 through touch.

FIG. 4 is an exploded perspective view of the mobile terminal shown in FIG. 3.

The terminal body contains a printed circuit board (PCB) 181. The PCB 181 may be mounted in the front case 101, the rear case 102 or a separate structure. The separate structure may be the frame 104. While the front case 101 and the rear case 102 are separately provided in the following description, the present invention is not limited thereto and the front case 101 and the rear case 102 may be integrated.

The PCB 181 is configured as an example of the controller (180 of FIG. 1) for executing functions of the mobile terminal 100. The PCB 181 includes various electronic elements mounted therein to execute functions of the controller 180. A plurality of PCBs 181 may be provided and combined to execute the functions of the controller 180. For example, the PCB 181 can include a main PCB and a sub PCB which are electrically connected, and at least parts of the main PCB and the sub PCBs can overlap in the thickness direction of the terminal body in an extended structure.

The rear case 102 has a battery accommodating part 192 for accommodating the battery 191 and the battery cover 103 is detachably combined with the rear case 102 so as to cover the battery accommodating part 192. Distinguished from the aforementioned structure in which the battery 191 is detachable, the battery 191 may be embedded in the terminal body such that the battery 191 cannot be separated from the terminal body. The rear case 102 may have a receiving portion 102a and a camera hole 102d. The receiving portion 102a may be formed on a surface of the rear case 102. The receiving portion 102a may form an empty space with respect to the battery cover 103. The receiving portion 102a may accommodate at least a portion of the rear input module 200. The camera hole 102d may be located corresponding to the hole 103a of the battery cover 103 and/or the camera module 121'.

The camera module 121' is electrically connected to the PCB 181 and provided to the rear side of the terminal body so as to photograph an object. The camera module 121' may be exposed from the rear side of the terminal body through a hole 103a formed in the battery cover 103.

The rear input module 200 is arranged on the rear side of the terminal body and is configured to receive control commands. The rear input module 200 may overlap with the display 151 provided to the front side of the terminal body in the thickness direction of the terminal body. For example, the rear input module 200 can be provided to the upper part of the rear side of the terminal body such that the user can easily manipulate the rear input module 200 while griping the terminal body with one hand. However, the present invention is not limited thereto and the position of the rear input module 200 may be changed.

The rear input module 200 provided to the rear side of the terminal body can enable implementation of a new user interface. In addition, the rear input module 200 can execute functions of the front input unit 131 such that the front input unit 131 is removed from the front side of the terminal body. In this case, the display 151 provided to the front side of the terminal body can have a larger screen.

The rear input module 200 may include a module board 210, an adhesive tape 220 and a guide 230.

The module board 210 may include at least one dome switch 214 for switching push operation applied by the user to the rear input module 200 into an electrical signal. For example, first, second and third dome switches 214a, 214b and 214c can be vertically arranged in a line. The first, second and third dome switches 214a, 214b and 214c may correspond to volume control, power on/off, start, end and scroll functions.

The module board 210 may include at least one LED 211 as a light-emitting unit. The LED 211 can operate on the basis of a control signal of the controller 180. For example, the LED 211 can operate while the user uses the rear input module 200. The LED 211 can operate when input through the rear input module 200 is needed. The rear input module 200 according to an embodiment of the present invention may be concealed by the battery cover 103, as described above. Accordingly, when the LED 211 emits light, the user can clearly recognize the position of the rear input module 200.

The adhesive tape 220 may be disposed between the module board 210 and the guide 230. The adhesive tape 220 may have an adhesive material coated on the both sides thereof. Accordingly, the guide 230 can be fixed to the module board 210 using the adhesive tape 220.

The guide 230 may have a form surrounding the dome switch 214. For example, the guide 230 may be arranged around the circumferences of the first, second and third dome switches 214a, 214b and 214c. The guide 230 may be arranged in a circular shape around the circumference of the dome switch 214.

The guide 230 can guide a specific dome switch 214 to be pushed when the user pushes the rear input module 200 to select the dome switch 214. That is, since the guide 230 is provided to surround each of the first, second third dome switches 214a, 214b and 214c, when a specific dome switch 214 is pushed, another dome switch 214 can be prevented from being pushed.

The guide 230 can serve as a light diffusing member that transfers light emitted from the LED 211. For example, light emitted from the LED 211 can be transferred along the light diffusing member. Accordingly, the LED 211 can emit light in a circular form along the shape of the guide 230. A region of the battery cover 103, which corresponds to the guide 230, may have fine through-holes formed therein. That is, while the user may not see or fell the through-holes, light can be transferred through the though-holes. Light transferred along the guide 230 can be observed by the user through the fine through-holes of the battery cover 103. Accordingly, the user can easily recognize the position of the rear input module 200.

FIG. 5 is a perspective view of the module terminal shown in FIG. 3 when the battery cover is removed therefrom.

As shown in FIG. 5, the mobile terminal 100 according to an embodiment of the present invention may have at least one guide protrusion 212 for guiding a coupling position of the guide 230. For example, first and second guide protrusions 212a and 212b can be formed in the thickness direction of the mobile terminal 100.

The first and second guide protrusions 212a and 212b can contact the guide 230 outside the guide 230. The first and second guides 212a and 212b enable the guide 230 to be correctly fixed to a designed position. In addition, the first and second guides 212a and 212b can prevent the guide 230 from being separated from the initial position due to repeated push operation of the user.

FIG. 6 shows a rear view and cross-sectional views of the battery cover of the mobile terminal shown in FIG. 3.

As shown in FIG. 6, an input guide 240 may be provided to the rear side of the battery cover 103 of the mobile terminal 100 so as to enable a key intended by the user to be correctly input.

Referring to FIG. 6(a), the input guide 240 may be provided to the rear side of the battery cover 103. The position of the input guide 240 may correspond to the position of the rear input module 200. The input guide 240 may include at least one elastic rib 244 and at least one contact protrusion 246.

FIGS. 6(b) and 6(c) are cross-sectional views of the input guide 240, taken along line I-I.

As shown in FIG. 6(b), the at least one elastic rib 244 may protrude from the input guide 240 and be bent multiple times.

The elastic rib 244 has elasticity. For example, the elastic rib 244 can be formed of a material having specific elasticity, such as stainless steel (STS). Due to elasticity, the shape of the elastic rib 244 can change when the user presses the battery cover 103 and can return to an initial shape upon release of pressure of the user.

The elastic rib 244 may be formed through insert injection molding. That is, the elastic rib 244 may be shaped through a separate process and then integrated with the battery cover 103 through insert injection molding.

The contact protrusion 246 may be formed on the battery cover 103. The positions and number of contact protrusions 246 may correspond to those of the dome switches (214 of FIG. 5). For example, if the first, second and third dome switches (214a, 214b and 214c of FIG. 5) are present, first, second and third contact protrusions 246a, 246b and 246c can be provided to positions corresponding to the first, second and third dome switches The contact protrusion 246 may be formed of the same material as the body 242 of the input guide 240. That is, the contact protrusion 246 can be formed together with the input guide 240 when the input guide 240 is injection-molded.

The contact protrusion 246 can press a specific dome switch (214 of FIG. 5) corresponding to push operation of the user when the user pushes the input guide 240. The pushed specific dome switch (214 of FIG. 5) can generate an electrical signal. The controller 180 can perform operation intended by the user on the basis of the electrical signal of the specific dome switch (214 of FIG. 5).

Referring to FIG. 6(c), the contact protrusion 246 may be made of a material different from the body 242 of the input guide 240. For example, the contact protrusion 246 can be made of a rubber material while the body 242 of the input guide 240 is made of polycarbonate. When the contact protrusion 246 is formed of rubber, the user can differently feel the input guide 240 when pushing the input guide 240. The contact protrusion 246 made of rubber may be insert injection-molded into the input guide 240.

FIG. 7 illustrates operation of the rear input module of the mobile terminal shown in FIG. 3.

As shown in FIG. 7, the mobile terminal 100 according to an embodiment of the present invention can generate an electrical signal only from a dome switch 214 corresponding to a point pushed by the user.

Referring to FIG. 7(a), the contact protrusion 246 of the battery cover 103 and the dome switch 214 of the rear case 102 may face each other. When the user does not push the battery cover 103, the contact protrusion 246 and the dome switch 214 may be separated from each other by a predetermined distance. In addition, the elastic rib 244 may be separated from the guide 230 by a predetermined distance.

Referring to FIG. 7(b), the user may push a specific portion of the battery cover 103 with predetermined force F. For example, the user can push the portion of the battery cover 103, corresponding to the second contact protrusion 214b. When the force F is applied to the corresponding portion of the battery cover 103, the battery cover 103 can be elastically deformed around the portion. Upon elastic deformation of the battery cover 103, the second contact protrusion 214b moves down to contact the second dome switch 214b, thereby transferring force F. The pushed second dome switch 214b can generate a predetermined electrical signal.

As the battery cover 103 is elastically deformed by the force F, the elastic rib 244 of the battery cover 103 can come into contact with the guide 230 of the rear case 102. The elastic rib 244 in contact with the guide 230 can be elastically deformed and thus the end of the elastic rib 244 can come into contact with the battery cover 103. When the end of the elastic rib 244 contacts the battery cover 103, the elastic rib 244 may be deformed no more. The elastic rib 244 that is not deformed can prevent the battery cover 103 from elastic deformation. That is, the elastic rib 244 can prevent a portion elastically deformed by the force F from being spread to the outside of the second contact protrusion 246b. Accordingly, the first and third contact protrusions 246a and 246c can be prevented from unintentionally contacting the first and third dome switches 214a and 214c when the force F applied by the user is excessive.

A pair of elastic ribs 244 may be provided having the second contact protrusion 246b disposed therebetween. That is, the elastic ribs 244 may be disposed on both sides of the second dome switch 214b. Since the pair of elastic ribs 244 have the second contact protrusion 246b disposed therebetween, only a pressed contact protrusion 246 can contact the dome switch 214 corresponding thereto.

The upper part of the guide 230, which contacts the elastic rib 244, may be rounded such that the elastic rib 244 can smoothly come into contact with the guide 230.

FIGS. 8, 9 and 10 illustrate operations of the rear input module of the mobile terminal shown in FIG. 32 according to various embodiments of the present invention.

As shown in the figures, in the mobile terminal 100 according to various embodiments of the present invention, the elastic ribs 244 can be configured in various forms.

Referring to FIG. 8(a), a pair of elastic ribs 244 may be configured to face each other. Specifically, the ends of the elastic ribs 244 can face the second contact protrusion 246b.

Referring to FIG. 8(b), when first force F1 and second force F2 are applied to the battery cover 103, the elastic ribs 244 facing the second contact protrusion 246b can effectively prevent the portion of the battery cover 103, which corresponds to the second contact protrusion 246b, from being deformed. That is, the elastic ribs 2454 in contact with the guide 230 can prevent additional deformation of the battery cover 103 by contacting the rear side of the battery cover 103.

As shown in FIG. 9(a), the elastic ribs 244 may be configured in a semicircular form.

As shown in FIG. 9(h), the semicircular elastic ribs 244 can directly contact the rear case 102 to be elastically deformed when pressing force F is applied thereto. The elastic ribs 244 in contact with the rear case 102 can be elastically deformed until the ends thereof contact the battery cover 103.

The guide 230 may have a rectangular cross section. Since the semicircular elastic ribs 244 directly contact the battery cover 103 instead of the guide 230, the guide 230 can be formed such that the cross section thereof has a rectangular shape. Accordingly, the guide 230 can be formed more easily.

Referring to FIG. 10(a), the ends of the pair of semicircular elastic ribs 244 may face the second contact protrusion 246b.

Referring to FIG. 10(b), when the ends of the semicircular elastic ribs 244 face the second contact protrusion 246b, an unwanted portion of the elastic ribs 244 can be prevented from being deformed by the first and second pressing forces F1 and F2.

FIGS. 11 and 12 illustrate a configuration of the battery cover of the mobile terminal shown in FIG. 3.

As shown in the figures, the battery cover 103 of the mobile terminal 100 according to an embodiment of the present invention may be configured such that different regions of the battery cover 103 feel different to the user.

Referring to FIG. 11, the battery cover 103 may have a coarse area CA and a smooth area BA.

The coarse area CA may be felt by the user as an area having fine concave-convex portions according to touch through their finger and/or palm.

The smooth area BA may be felt by the user as an area having no concave-convex portions when the user touches the smooth area BA using their finger and/or palm.

The smooth area BA may correspond to the rear input module 200 according to an embodiment of the present invention. That is, the smooth area BA can correspond to the shape of the rear input module 200.

The rear input module 200 is covered by the battery cover 103, as described above. Accordingly, the rear input module 200 may not be visually clearly recognized. However, presence of the coarse area CA and the smooth area BA enables the user gripping the mobile terminal 100 to recognize the position of the rear input module 200 through tactile sensation. Accordingly, it is possible to manipulate the rear input module 200 conveniently while achieving the mobile terminal having a beautiful exterior design. The coarse area CA and the smooth area BA may be interchanged.

The battery cover 103 may have fine through-holes, as described above. That is, through-holes through which light passes can be formed in the portion of the battery cover 103, which corresponds to the rear input module 200. The rear input module 200 can emit light when user input is applied thereto and/or when input from the user is needed. The light from the rear input module 200 passes through the fine through-holes to be emitted such that the user can visually recognize the position of the rear input module 200.

The portion of the battery cover 103 which corresponds to the rear input module 200 may be thinner than the other portion. In this case, light emitted from the rear input module 200 can be observed from the outside even if the battery cover 103 does not have the fine through-holes.

Referring to FIG. 12, the coarse area CA and/or the smooth area BA may be formed by processing the battery cover 103 through a predetermined process.

As shown in FIG. 12(a), a first layer L1 may be formed on a substrate S of the battery cover 103. The first layer L1 may be a predetermined pattern. The pattern may be formed in a predetermined height at a predetermined interval on the battery cover 103.

Referring to FIG. 12(b), a second layer L2 may be formed on the first layer L1. The second layer L2 may be a base color layer. That is, the second layer L2 may be a layer that determines a color to be expressed after completion of the process.

Referring to FIG. 12(c), a third layer L3 may be formed on the second layer L2. The third layer L3 may be a base UV layer. That is, the third layer L3 may be made of a material that responds to UV. After formation of the third layer L3, a process of applying UV to the third layer L3 may be performed.

Referring to FIG. 12(d), a fourth layer L4 may be formed on the third layer L3. The fourth layer L4 may be a top coating layer. An area in which the fourth layer L4 is formed can feel smooth to the user. Accordingly, the first to fourth layers are formed in the smooth area BA such that the user can feel the smooth area BA differently from the coarse area CA.

FIGS. 13 and 14 illustrate a configuration of the mobile terminal battery cover shown in FIG. 3 according to another embodiment of the present invention.

As shown in the figures, the mobile terminal 100 according to another embodiment of the present invention may be configured such that the battery cover 103 has different temperatures according to regions thereof so as to enable the user to intuitively sense a specific region.

Referring to FIG. 13, a thermally conductive sheet TS having a high heat transfer coefficient may be attached to the inside of the battery cover 103. The thermally conductive sheet TS can rapidly collect and/or transfer heat generated from electronic elements of the mobile terminal 100 during operation of the mobile terminal 100. Accordingly, the temperature of the region of the battery cover 103, to which the thermally conductive sheet TS is attached, can be higher than the other region. Accordingly, the user who touches the corresponding region can sense a temperature difference.

The thermally conductive sheet TS may be attached to the area in which the input guide 240 is disposed. That is, the thermally conductive sheet TS may be attached to the region of the battery cover 103, which corresponds to the rear input module 200. Due to the thermally conductive sheet TS, the temperature of the input guide 240 may be higher than other regions. Accordingly, the user can sense the input guide 240 only by touching the battery cover 103 with a finger or a palm without visually checking the position of the input guide 240.

Referring to FIG. 14, the thermally conductive sheet TS may be attached to the inside, that is, the rear side, of the battery cover 103.

A first area A1 of the battery cover 103, in which the contact protrusion 246 is disposed, may be thinner than second and/or third areas A2 and A3. For example, when the thickness of the first area A1 is t1, the thickness of the third area A3 can be t2 less than t1.

Since first area A1 is thinner than other areas, heat transferred from the thermally conductive sheet TS can be sensed more distinctly in the first area A1. Accordingly, the user can sense the position of the input guide 240 more clearly.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A mobile terminal, comprising:
a display;
a first case forming a front side of the terminal to which the display is provided;
a second case coupled with the first case and including a battery accommodating part and a rear input module having at least one button through which a user input is received; and
a battery cover coupled with the second case and forming a rear side of the terminal,
wherein:
the battery cover covers the battery accommodating part and the rear input module when the battery cover is coupled with the second case; and
the battery cover is elastically deformed by external force applied to the battery cover by the user input received in a thickness direction of the terminal such that control commands are generated when the external force is further applied to the at least one button included in the covered rear input module.

2. The mobile terminal of claim 1, further comprising a camera module configured to photograph objects behind a terminal body formed according to combination of the first and second cases and provided to the rear side of the terminal body,
wherein the battery cover has at least one through-hole through which at least part of the camera module is exposed.

3. The mobile terminal of claim 1, wherein the rear input module comprises:
a module board including at least one dome switch; and
a guide arranged around the circumference of the at least one dome switch.

4. The mobile terminal of claim 3, wherein a plurality of dome switches is provided, wherein the dome switches are vertically arranged in a line in a body of the terminal.

5. The mobile terminal of claim 3, wherein the rear input module further comprises a light-emitting unit emitting light according to a control signal of a controller,
wherein the guide is a light diffusing member transferring the light emitted from the light-emitting unit along the guide.

6. The mobile terminal of claim 5, wherein the battery cover has at least one fine through-hole through which the light transferred along the guide is emitted to outside of the mobile terminal, the at least one fine through-hole being formed at a position corresponding to the guide.

7. The mobile terminal of claim 3, wherein the rear input module further comprises at least one guide protrusion contacting an outside of the guide so as to fix a coupling position of the guide.

8. The mobile terminal of claim 3, wherein the battery cover has at least one contact protrusion and at least one elastic rib provided therein, the at least one contact protrusion being disposed at a position corresponding to the at least one dome switch, the at least one elastic rib protruding toward the rear input module around the at least one contact protrusion.

9. The mobile terminal of claim 8, wherein one end of the at least one elastic rib comes into contact with the second case so as to prevent at least one of the first case or the second case from being deformed by the external force further applied to the at least one of the first case and the second case.

10. The mobile terminal of claim 8, wherein the at least one elastic rib is elastically deformed by contacting the guide when the external force is further applied to the at least one of the first case and the second case.

11. The mobile terminal of claim 8, wherein the at least one elastic rib is elastically deformed by contacting the second case when the external force is applied to the battery cover.

12. The mobile terminal of claim 8, wherein a pair of elastic ribs is provided having a center contact protrusion, from among the at least one contact protrusion, disposed therebetween.

13. The mobile terminal of claim 8, wherein the at least one contact protrusion comes into contact with a dome switch corresponding to the at least one contact protrusion, from among the at least one dome switch, when the external force is applied to the battery cover.

14. The mobile terminal of claim 8, wherein at least one of the at least one elastic rib and the at least one contact protrusion is insert-injection-molded into the battery cover.

15. The mobile terminal of claim 1, wherein:
an outer surface of the battery cover includes a coarse area sensed through concave-convex portions formed therein according to tactile sensation; and
the outer surface of the battery cover further includes a smooth area on which concave-convex portions are not formed, a position of the smooth area corresponding to a position of the rear input module.

16. The mobile terminal of claim 15, wherein at least one of the coarse area and the smooth area is formed by laminating at least one layer on the outer surface of the battery cover.

17. The mobile terminal of claim 15, wherein inside of the battery cover includes a thermally conductive sheet having a high thermal transfer coefficient, the thermally conductive sheet being attached to the smooth area corresponding to the position of the rear input module.

18. The mobile terminal of claim 17, wherein a thickness of at least part of the smooth area of the battery cover, to which the thermally conductive sheet is attached, differs from a thickness of at least part of an area to which the thermally conductive sheet is not attached.

19. The mobile terminal of claim 18, wherein the at least part of the smooth area to which the thermally conductive sheet is attached is thinner than the at least part of the area to which the thermally conductive sheet is not attached.

20. The mobile terminal of claim 1, wherein the rear input module is arranged to overlap with the display in the thickness direction of the terminal.

21. The mobile terminal of claim 1, wherein the battery accommodating part is shaped and configured to receive a battery.

22. The mobile terminal of claim 21, wherein the battery accommodating part is located at a first portion of the second case and the rear input module is located at a second portion of the second case that does not overlap with the first portion.

* * * * *